United States Patent [19] [11] 3,959,572
McCartan et al. [45] May 25, 1976

[54] COATED MOLDED PANEL MEMBER
[75] Inventors: Daniel A. McCartan, Heath; Neal A. Corcoran, Jr., Columbus, both of Ohio
[73] Assignee: Owens-Corning Fiberglas Corporation, Toledo, Ohio
[22] Filed: Aug. 22, 1974
[21] Appl. No.: 499,711

Related U.S. Application Data
[63] Continuation of Ser. No. 231,857, March 6, 1972.

[52] U.S. Cl. .............................. 428/172; 428/220; 428/285; 428/290
[51] Int. Cl.$^2$ .................... B32B 5/26; B32B 5/28
[58] Field of Search ........................ 161/60, 92, 98; 181/33 G; 264/257, 258; 428/114, 172, 220, 285, 290

[56] References Cited
UNITED STATES PATENTS

| | | | |
|---|---|---|---|
| 2,407,548 | 9/1946 | Goldman | 161/60 |
| 2,705,686 | 4/1952 | Ness et al. | 161/60 |
| 3,008,861 | 11/1961 | Rees et el. | 161/98 |
| 3,043,733 | 7/1962 | Harmon et al. | 181/33 G |
| 3,082,143 | 3/1963 | Smith | 181/33 G |
| 3,141,809 | 7/1964 | DeMaio et al. | 161/93 |
| 3,159,235 | 12/1964 | Young et al. | 181/33 G |
| 3,418,198 | 12/1968 | Einstman | 161/98 |
| 3,441,465 | 4/1969 | Pearson | 161/84 |
| 3,583,522 | 6/1971 | Rohweder | 181/33 G |

Primary Examiner—William J. Van Balen
Assistant Examiner—R. J. Roche
Attorney, Agent, or Firm—John W. Overman; Allen D. Gutchess, Jr.

[57] ABSTRACT

A coated, decorative panel or tile of molded fibrous material is provided. A pad or pelt of mineral fibers, preferably glass fibers held together by a binder in an uncured state, is compressed and heated in a matched metal contoured mold to the desired permanent shape, after which a finish coating is supplied. The fibers of the panel are heterogeneously arranged with most fibers being parallel to the contoured surface of the product but with some lying angularly with respect thereto. Also, some portions of the uncured fiber pad may be compressed in the mold to a greater extent than others. In addition, the concentration of binder may also vary widely over the product. These factors result in a variation in the apparent density, and when the panel is subsequently coated, the degree of absorption of the coating material differs widely, resulting in an undesirable nonuniform appearance. To overcome these problems, a fibrous sheet is disposed on the surface of the uncured pad which is to be molded to the desired contour. When the product is molded, the sheet conforms to the three-dimensional contoured surface of the mold along with the fibrous pad, with the sheet bridging the more open portions of the product surface and masking non-uniform areas thereof. A substantially more uniform appearance is thereby achieved even when the product is coated with less coating material after molding.

1 Claim, 6 Drawing Figures

COATED MOLDED PANEL MEMBER

This is a continuation of application Ser. No. 231,857, filed Mar. 6, 1972.

This invention relates to a coated, decorative panel or tile, and particularly to such a panel or tile having a fibrous sheet on an obverse surface thereof under a finish coating material applied thereto.

Molded decorative panels or tiles of mineral fibers and particularly glass fibers are known in the art and are becoming more popular. Tiles of this nature are shown and disclosed more fully in Jones et al U.S. Pat. No. 3,492,771. Such tiles can be made in a variety of designs particularly because the glass fibers more fully assume and reproduce the contour of the design as incorporated into matched-metal forming dies or molds. In other words, the glass fibers achieve a higher fidelity in reproducing the design of the mold surface than is possible with other fibers, such as wood fibers.

After the panel is molded and the binder cured, it can be covered with a suitable coating material, such as paint, for a final decorative effect. The glass fibers in the product, however, are heterogeneously disposed with most parallel to the surface of the tile but with some angularly positioned with respect thereto, with the spacing of the fibers also varying, depending on the degree of compaction. In addition, the molded tile or panel is subject to variations in the amount of binder present. These factors all affect the degree of absorption of the paint into the panel. Consequently, when the coating material is applied to the surface, it soaks in at different rates and produces a non-uniform, rather mottled appearance. This can be offset to some extent by using substantially more paint than otherwise required to flood the surface and fill in the more porous portions. However, the details of the surface pattern thereby tend to be obscured and the flooded portions produce a less flat surface appearance, which is generally not as desirable for a decorative ceiling panel or tile, for example. Also, in the production of such panels the binder used with the fibers tends to stick to the mold and build up thereon, requiring time-consuming cleaning.

In accordance with the invention, it has been discovered that a facing sheet of a non-woven, cloth-like, draftable material can be applied to the pad or pelt of uncured fibrous material before being placed in the mold to overcome the above disadvantages. The sheet can be applied to the fibers directly during forming of the pad so that no additional labor is required, or can simply be laid on the pad prior to being placed in the mold. The sheet assumes the configuration of the mold surface with a high degree of fidelity when the pad is compressed between the matched-metal mold sections. The sheet thereby forms a web or bridge over the less dense portions of the resulting product to provide a substantially more uniformly absorptive surface to which the coating material is applied. The sheet also masks irregularities or discolorations in the mold pad or pelt and thereby enhances the final decorative effect of the panel or tile. The use of the sheet on the product reduces coating material requirements by at least twenty percent and at the same time improves the uniformity of the appearance of the product. A uniform, flatter finish is thereby achieved on the tile or panel due to the reduced amount of paint and such finish is generally preferred for ceiling tiles and the like. Further, the sheet acts as a parting agent between the front face of the pad and the mold surface to substantially eliminate binder build-up in the mold and the otherwise required frequent cleaning. The handleability of the tile is also improved, particularly at the edges of the tile where the fibrous sheet can cover glass fibers otherwise projecting at such edges.

It is, therefore, a principal object of the invention to provide a decorative panel or tile having a more uniform, improved appearance on the obverse face thereof.

Another object of the invention is to provide a decorative panel or tile requiring less coating material than heretofore.

Still another object of the invention is to provide a molded panel or tile having a draftable sheet material on a face thereof which acts as a parting agent and minimizes the requirement for mold cleaning.

Yet another object of the invention is to provide a decorative panel or tile having a uniformly flatter finish.

A further object of the invention is to provide a decorative tile or panel having improved handleability.

Other objects and advantages of the invention will be apparent from the following detailed description of a preferred embodiment thereof, reference being made to the accompanying drawings, in which.

Figure 1:
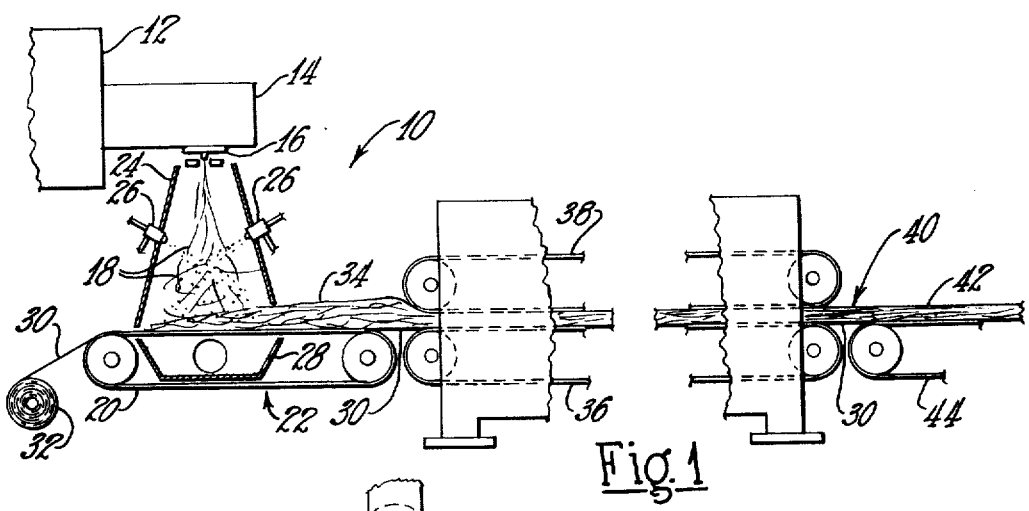
FIG. 1 is a schematic, fragmentary side view in elevation of a fiber-forming line which can be used to produce a pad or pelt from which a decorative panel according to the invention can be molded.

Referring to the drawings and more particularly FIG. 1, a fiber-forming line 10 can be used to produce a pad or pelt according to the invention, with substantially no additional labor being required over and above that employed to make a conventional pad. Accordingly, glass is melted in a tank 12 and supplied through a forehearth 14 to a fiber-forming unit 16. Fibers indicated at 18 are attenuated from the unit and move downwardly, the fibers 18 being deposited on a belt 20 of a conveyor 22. Binder can be applied to the fibers in a forming hood 24 by suitable spray applicators 26. The fibers are gathered on the belt with the aid of a vacuum chamber 28 located below the upper run of the belt 20. This basic apparatus is well known in the art and will not be discussed in detail.

In accordance with the invention, a non-woven sheet 30 is supplied onto the upper run of the belt 22 from a supply spool 32. The sheet preferably is porous and does not seriously inhibit the function of the vacuum chamber 28 in collecting the fibers on the belt 20. The fibers 18 with the binder applied thereto are deposited directly on the sheet 30 as it moves toward the right, as viewed in FIG. 1. The sheet thereby can be adhered directly to the fibers through the binder, with the fibers also being adhered to one another by the binder.

Figure 3:
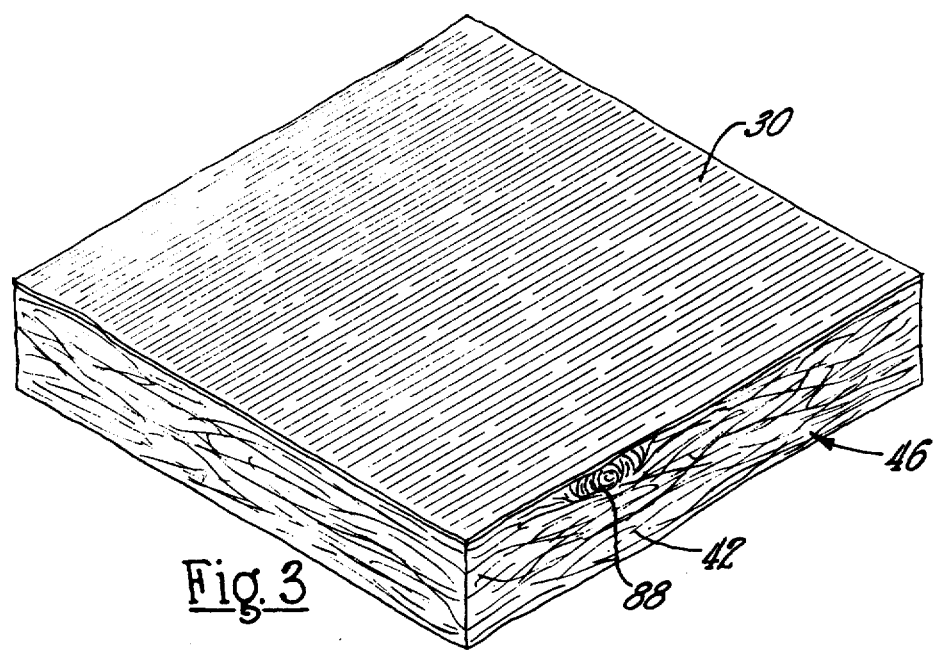
FIG. 3 is a somewhat schematic view in perspective of a pad or pelt made with the apparatus of FIG. 1 and ready for insertion into the molding apparatus of FIG. 2.

The sheet 30 and a resulting layer 34 of the fibers 18 are then carried between two conveyors 36 and 38 which are spaced apart a predetermined distance to place the surfaces of the fiber layer 34 in smooth, parallel relationship. A pad 40 for the mold charge is thereby produced, consisting of the sheet 30 and a smooth, uniform layer 42 of the fibers 18 adhered thereto. The pad 40 can then be carried away by an exit conveyor 44 to a point where it can be cut to predetermined shape and size. Alternately, the pad can be stored on a reel and transported closer to a point of final use, if desired, at which time the pad can be cut to the proper size. A final pelt or pad 46 (FIG. 3) serving as a mold charge results, consisting of the layer 42 and the sheet 30 cut to a desired size. In this state, the binder is not cured so that the pad is deformable, but the binder still provides structural integrity for the pad.

Of course, rather than applying the sheet 30 to the layer 42 on the production line 10, the layer 42 can be formed without the sheet which can then simply be laid on the top surface of the layer 42 prior to it being placed in the molding apparatus.

Figure 2:
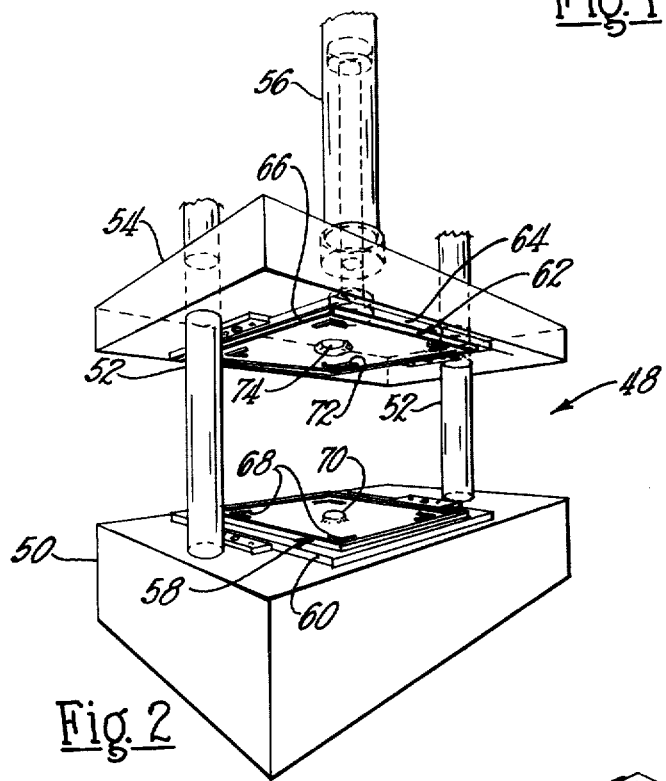
FIG. 2 is a schematic view in perspective of molding apparatus for producing a decorative panel according to the invention.

Molding apparatus 48 of FIG. 2 is representative of apparatus for making the panels or tiles by matched-metal die compression molding. The apparatus 48 includes a base 50 with upwardly extending columns or ways 52 on which is slidably mounted a head 54. The head 54 is moved vertically by a fluid-operated actuator 56 of a suitable design, suitably supported overhead.

A lower mold half or die section 58 is mounted on a backing plate 60 and supported on the base 50. A matched upper mold half or die section 62 is mounted on a backing plate 64 and affixed to the lower surface of the head 54 by suitable fasteners. Dowels or other suitable means can be employed to place the mold halves 58 and 62 in accurate registry when the head 54 is moved downwardly by the actuator 56. The upper mold half 62 has a trim lip or ridge 66 which moves into contact with a corresponding surface of the lower mold 58 to place the surfaces of the two mold halves in a predetermined spaced relationship when the mold halves are fully closed. The pad 46 is somewhat larger in area than the title or panel to be made so that portions thereof extend beyond the edges of the final product and are cut off by the trim lip 66 of the upper mold half 62. The pad also is much thicker than the distance between the mold halves, when closed.

Figure 4:
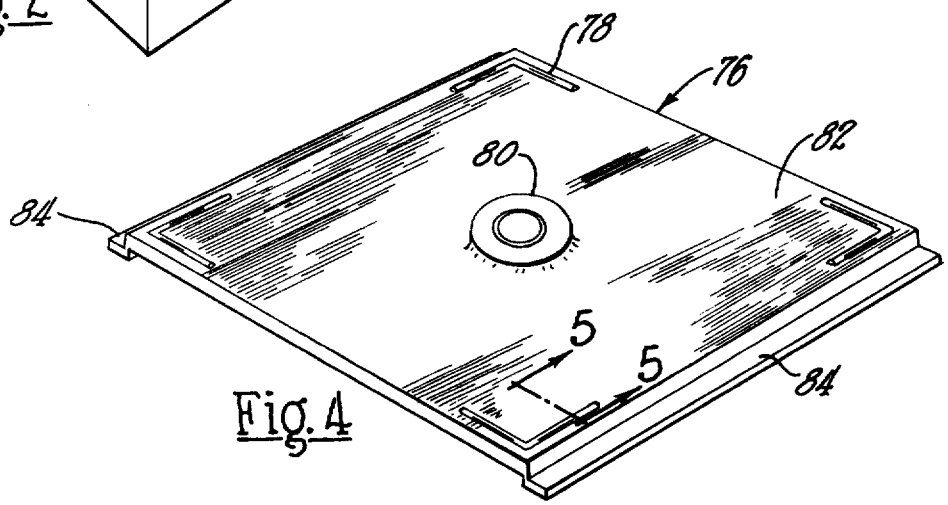
FIG. 4 is a somewhat schematic view in perspective of a decorative panel or tile made according to the invention.

The design produced by the mold halves 58 and 62 can be almost umlimited. As shown in the specific example, the lower mold half 58 has corner angular projections or ridges 68 and a central large projection 70 which cooperate with corner angular recesses or groves 72 and a central recess 74 in the upper mold half 62. These produce a molded panel or tile 76 of FIG. 4, having corner angular projections or ridges 78 and a central projection 80 on an obverse surface 82 thereof. The tile 76 also has suitable flanges 84 formed at two opposite edges thereof by means of which the tile 76 can be affixed to a ceiling or other supporting surface, as is shown more fully in the aforementioned Jones et al U.S. Pat. No. 3,492,771.

The tile is compressed and densified between the mold halves 58 and 62, being in the order of ⅛ inch thick, compared with the pad 46 being as much as two inches thick. The tile, made with glass fibers in the order of 0.00025–0.00035 inch in diameter, has an apparent density in the order of 15–35 pcf. The binder is thermosetting and usually is a phenolic, present in an amount of about 15–20% by weight, on the average. Typically, the mold halves 58 and 62 are heated to a temperature of 500°F. for a period of 45 seconds to effect curing or polymerization of the thermosetting binder which binds the fibers together as well as the sheets 30 (FIG. 3) to the fibers. While the mold halves 58 and 62 are brought together under considerable pressure, the extent to which their surfaces move toward one another is limited by the trim lips 66 or similar projections. Consequently the pressure exerted by the fibrous layer 42 in pushing the sheet 30 against the surface of the upper mold half 62 is only in the order of 10 psi.

Figure 5:
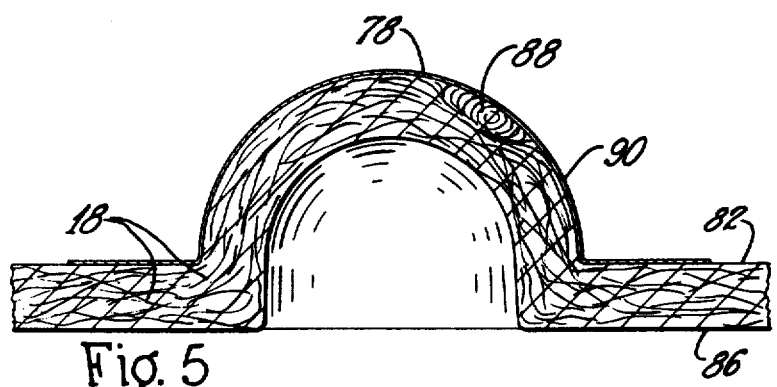
FIG. 5 is a greatly enlarged, fragmentary, schematic view in cross section, taken along the line 5—5 of FIG. 4.
Figure 6:
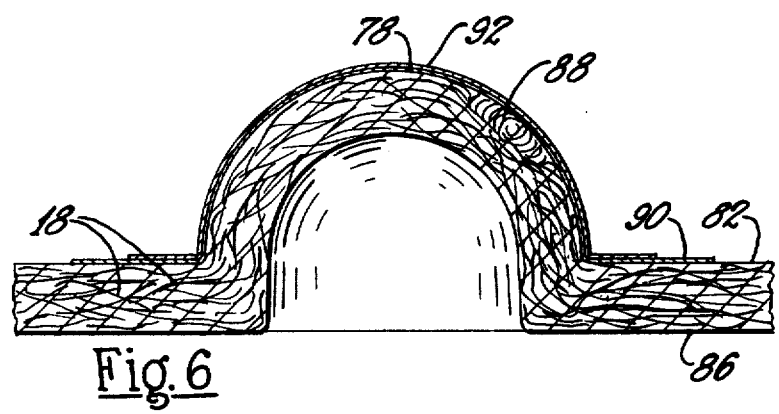
FIG. 6 is a view similar to FIG. 5 but further showing a layer of coating material on the panel.

The fibers in the pad 46 tend to lie parallel to the main surfaces thereof but otherwise are heterogeneously arranged. The high degree of compression of the pad 46 causes the fibers to tend to be parallel to the obverse surface or face 82 thereof and also to a back surface 86 (FIG. 5 and 6). However, some of the fibers will be disposed at angles to the surfaces 82 and 86 and this will be particularly true of that portion of the surface 82 where a rather abrupt change in the surface exists, as at the projections or ridges 78. At such portions of the tile, the fibers will still tend to assume the configuration of the mold halves 58 and 62 initially but may be angularly disposed, particularly if there should be less binder at such areas than otherwise necessary to hold the fibers in the curved configuration, after the binder has been cured. The tile also may be thinner at the projection 78 and the fibers themselves may be spaced apart farther than at other portions because the curved configuration of the projection 78 may tend to spread or stretch out the fibers thereat. Compression of the fibers at such portions may also be less as a result of the surface configuration. Additionally, swirls or balls 88 of the fibers 18 sometimes tend to form in the hood 24 and are collected in the layer 42. The fibers of such balls tend more to lie angularly relative to the surfaces of the tile than do the other fibers. The binder in the pad 46 also is subject to rather wide variation in concentration or amount and causes a mottled appearance on the surface of the cured tile as well as a variation in apparent density.

All of these factors, namely the angularly disposition of some of fibers, the wider spacing or lighter density of fibers in portions of the tile, the balls 88 of fibers, and the variation in the amount of binder, have an effect on the degree to which the finish coating material, such as paint or the like, is absorbed in the tile. Consequently, a mottled appearance results after the tile is coated. For example, with a light paint, the portions of the tile in which the paint has been absorbed to the greatest extent appear darker than other portions. Greater uniformity in the appearance of the tile can be achieved by flooding the paint onto the tile to fill those portions into which the paint tends to soak. This, however, requires substantially more paint than would otherwise be needed and, further, tends to obscure some of the details of the design of the tile and to produce a shinier surface at portions thereof.

The sheet 30 on the layer 42 overcomes the above problems and has other advantages. The sheet 30 preferably is yieldable or stretchable in at least one direction to enable the sheet to conform fully, with a high degree of fidelity, to the contour of the upper mold half 62. A highly effective material for the sheet 30 is made by a dry lay process in which the fibers tend to be oriented in a single direction in the sheet. Such a sheet tends to be particularly yieldable or draftable in a direction transverse to the fibers. The sheet can also be made by a wet lay process by which the fibers are more randomly disposed. Such a sheet, however, displays less yield or drape in any direction than the dry lay sheet. Preferably the sheet is made entirely of rayon fibers, with the sheet being from 3-½ to 7 mils thick and weighing from ¼ to ¾ ounce per square yard, including a binder which can withstand the temperatures of the mold. Specifically, a satisfactory sheet consists of 100% rayon fibers bonded by an acrylic binder, having a thickness of 7 mils and weighing 15.8 grams per square yard. While it would not ordinarily be expected that the rayon fibers of the sheet 30 would withstand the temperature of up to 500°F. of the mold, apparently the higher temperature tends to soften the rayon fibers and enables them to conform even more effectively to the surface contour of the upper mold half 62 as the compressed fibers of the layer 40 urge the sheet 30 toward the surface of the mold half 62. A resulting contoured sheet 90 thereby masks variations in the obverse surface 82 of the tile and bridges portions where the tile tends to absorb more coating material because of the angular configuration of the fibers, or wider spacing thereof. The sheet also helps mask the darker and lighter areas caused by the variation in the concentration of binder and tends to level the degree to which the coating material soaks in due to variations in the amount of binder, the tile absorbing less coating material in those portions where the binder is more concentrated. Consequently a finish or decorative layer 92 of coating material can be achieved with greater uniformity in appearance and with about 20% less coating material than the amount required when applied directly to the surface 82 of the tile without the sheet 90 thereon. Portions of the tile thereby do not tend to be flooded and obscured by a heavy coating; a more uniform, flatter apperance is achieved without the shinier portions otherwise often resulting when a heavy coat is used. The coating can be applied by any suitable means, including electrostatic spraying if the sheet 30 can be suitably treated to carry an electrostatic charge.

It has also been necessary, when using the fibrous layer 42 directly with the mold halves 58 and 62, to clean the mold halves rather frequently because of binder and/or fibers from the pad 42 sticking to the upper mold half, particularly in the recesses 72 and 74 thereof. However, when the sheet 30 is used, it has been found that the sheet serves as a parting agent and enables the tile to be removed from the mold halves more easily than heretofore, with the need for cleaning the mold halves also being reduced. When the sheet 30 is applied to the fibrous layer 42 on the production line 10, the sheet 30 can act as a separating layer if the pad 40 is rolled onto a reel for storage prior to being cut and used. Consequently, the sheet 30 eliminates the need for paper to be used between the wraps of the pad material in the rolls.

Another advantage of the sheet 30 is that the final contoured sheet 90 extends to the edges of the tile and helps protect a worker removing the tile in mold from the fibers 18 of the layer 42, which otherwise can project at the tile edges and cause abrasion or cuts.

Various modifications of the above-described embodiment of the invention will be apparent to those skilled in the art and it is to be understood that such modifications can be made without departing from the scope of the invention, if they are within the spirit and the tenor of the accompanying claims.

We claim:

1. A molded, decorative, rigid panel made of a densified mass of glass fibers bonded to one another by a thermo-setting binder, said panel having a three-dimensional, contoured front surface and having a three-dimensional, contoured back surface, most of said fibers being disposed generally parallel to the surfaces of the panel but with some fibers extending angularly to the front surface, said binder in said panel varying in concentration in portions of said panel, a sheet consisting essentially of heat-softened, rayon fibers and a binder, said sheet being from 3½ to 7 mils thick and weighing from ¼ to ¾ ounce per square yard, the fibers of the sheet being adhered to said front surface of said panel and conforming to the contour of said front surface, the fibers of said sheet being non-woven and generally oriented in a common direction, said sheet being yieldable in at least one direction generally parallel to the plane of the sheet prior to being adhered to said front surface, the thermo-setting binder that bonds the glass fibers of said panel together also adhering said rayon fiber sheet to said three-dimensional, front surface of said panel, said sheet bridging over spaces among the panel fibers adjacent the front surface of the panel and masking non-uniformity of the front surface caused by variations in binder content, and a substantially uniform layer of coating material on said sheet.

* * * * *